United States Patent Office 2,986,699
Patented May 30, 1961

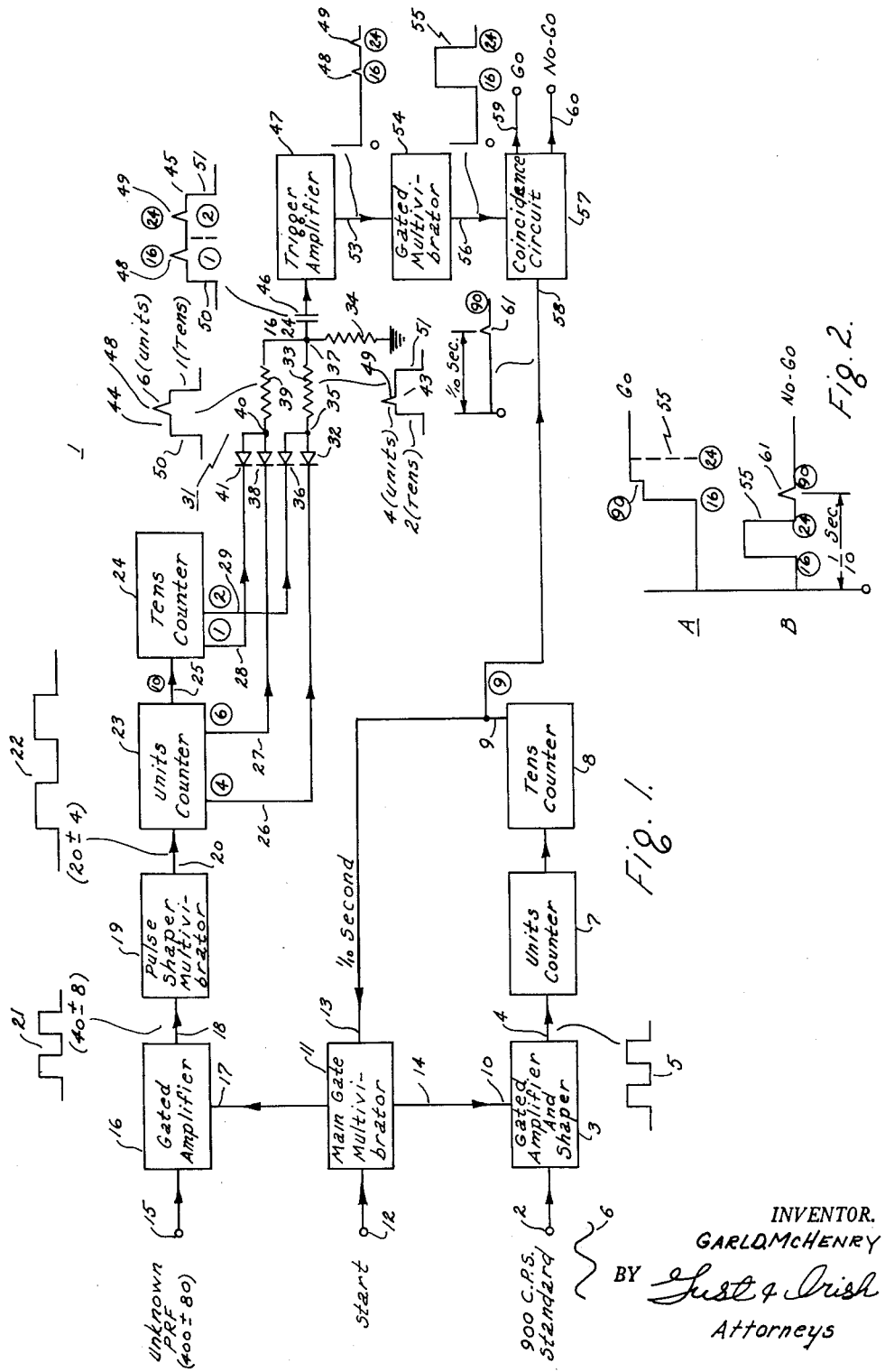

2,986,699
PRF COUNTER

Garl D. McHenry, Markle, Ind., assignor to International Telephone and Telegraph Corporation Filed Oct. 27, 1958, Ser. No. 769,805

11 Claims. (Cl. 324—79)

This invention relates to PRF counters and more particularly to a system for determining whether an unknown number of pulses occurring in a predetermined time interval is within desired limits.

There are instances in the design of electronic apparatus where it is desirable to determine whether the pulse repetition frequency (PRF) of a train of pulses is within a predetermined desired range. In prior devices for making such determinations known to the present applicant, phantastron circuits have been employed to count-down a tuning fork or synchronous clock output and to establish a time base, such as one second. In such prior devices, counter tubes were provided which were gated on during the phantastron count-down and the resultant limit pulses used to produce a standard gate to bias a thyratron with the plate voltage of the thyratron being switched on at the end of the time base period to determine whether the counter tubes stopped between the desired limits. Such prior devices thus required a mechanical time standard and the use of phantastron circuits involved quite complex circuitry and limited flexibility with regard to the time base and limits. It is therefore desirable to provide a system for determining whether the PRF of a train of pulses is within predetermined lower and upper limits, which system does not require mechanical time standards, such as tuning forks and synchronous clocks. It is further desirable that such a system involve simple circuitry and readily permit the use of different time bases and limits.

It is therefore an object of my invention to provide an improved system for determining whether an unknown number of pulses occurring in a predetermined time is within desired limits.

Another object of my invention is to provide an improved PRF counting system which does not require the use of mechanical time standards.

A further object of my invention is to provide an improved system for determining whether the PRF of a a train of pulses is within predetermined lower and upper limits which involves simpler circuitry than prior systems known to the present applicant, and which readily permits the use of different time bases and limits.

My invention, in its broader aspects, therefore, provides a first counting means, such as a ten digit counting tube, adapted to be connected to a source of standard frequency for counting the same and for providing a time base signal responsive to a predetermined number of cycles of the standard frequency counted thereby. Another counting means is provided adapted to be connected to the source of unknown PRF for counting the same, the first counting means being coupled to the second counting means for terminating the unknown pulses responsive to the time base signal. The second counting means is arranged to provide a first lower limit signal responsive to a first lower predetermined number of pulses of the unknown PRF counted thereby and a second upper limit signal responsive to a second upper predetermined number of pulses of the unknown PRF. Coincidence means, such as the thyratron evaluator, is coupled to the first and second counting means for providing an output signal responsive to occurrence of the time base signal between the lower and upper limit signals. Thus, the first and second counting means compare an unknown pulse rate against a known standard frequency for a predetermined time base signal, the time base signal being provided by one of the counting means and compared with limit pulses provided by the other counting means to provide an indication of coincidence between the time base signal and the limit signals. It is thus readily seen that by employing conventional ten digit counter tubes for the counting means, the length of the time base period and the upper and lower limits can be readily changed by merely switching to different cathodes of the counter tubes.

The above-mentioned and other features and objects of this invention and the manner of attaining them will become more apparent and the invention itself will be best understood by reference to the following description of an embodiment of the invention taken in conjunction with the accompanying drawings, wherein:

Fig. 1 is a schematic block diagram of my improved PRF counting system;

Fig. 2 is a diagrammatic illustration showing the functioning of the coincidence circuit of Fig. 1.

Figure 3:
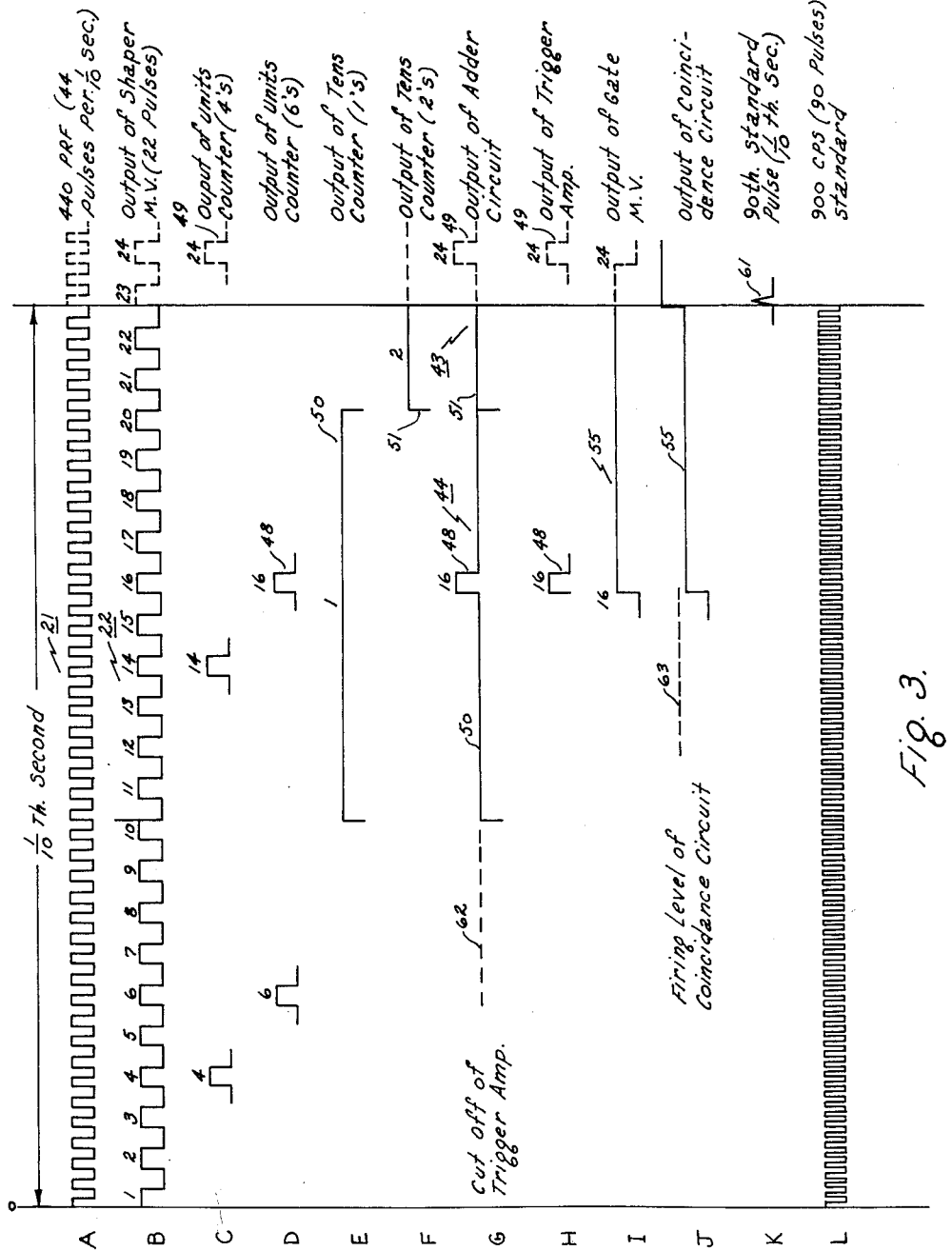
Fig. 3 is a digrammatic illustration showing the functioning of the system of Fig. 1.

Referring now to the drawings, my improved PRF counting system, generally identified as 1, includes a first input terminal 2 adapted to be connected to a source of standard frequency (not shown) such as a 900 cycle per second alternating current source. Input terminal 2 is in turn connected to a gated amplifier and shaper circuit 3 of any conventional design which provides in its output circuit 4 square pulses 5 having the same frequency or PRF as the 900 cycle sinusoidal wave form 6 applied to the input terminal 2. Gated amplifier 3 is further of the type which gates on and off, i.e., switches on and off, the square output pulses 5 responsive to appropriate gating signals impressed upon its gating input circuit 10. It will be readily understood that in the event that square pulses are already available at the input terminal 2 rather than the sinusoidal waveform signal 6, the square pulse shaping portion of the gated amplifier circuit 3 may be eliminated.

The output circuit 4 of gated amplifier and shaper 3 is connected to a ten digit counter 7 which in turn has its output circuit connected to another ten digit counter 8. Counters 7 and 8 are preferably conventional ten digit counting tubes, such as described in Sylvania Radio Tube Manual, Type 6476. Counter 7 thus counts the pulses 5 impressed on its input from the gated amplifier and shaper 3, providing one pulse to the counter 8 responsive to every ten pulses received from the amplifier and shaper 3. Counter 7 is thus referred to as a "units" counter and counter 8 referred to as a "tens" counter.

In the illustrated embodiment, the output circuit 9 of the "tens" counter 8 is taken from the ninth cathode to provide a time base signal or pulse. It will now be seen that with a 900 cycle standard frequency impressed upon input terminal 2, "units" counter 7 will provide one pulse to the "tens" counter 8 for each ten input pulses thereto, "tens" counter 8 likewise counting each pulse from the "units" counter 7 and providing an output pulse in its output circuit 9 responsive to the ninth pulse so received from the "units" counter, i.e., the time base pulse in the output circuit 9 of "tens" counter 8 thus occurs at the 90th pulse of the 900 cycle standard frequency impressed on input terminal 2, or after one-tenth (1/10) of a second following initial impression of the 900 cycle standard frequency on the "units" counter 7.

A main gate multivibrator circuit 11 is provided having an initiating signal input terminal 12 connected thereto adapted to be connected to a suitable source of initiating or "starting" signals and having another input circuit 13 connected to the output circuit 9 of the "tens" counter 8. Main gate multivibrator 11, which may incorporate any conventional monostable multivibrator has its output signal circuit 14 connected to the gating signal input circuit 10 of the gated amplifier and shaper 3. Main gate multivibrator 11 is arranged so that its output signal in its output circuit 14 impressed on the gating signal input circuit 10 of the gated amplifier and shaper 3 normally biases the gated amplifier and shaper 3 to cut-off so that no signal is provided in its output circuit 4 to be impressed upon the "units" counter 7. Impression of a suitable initiating signal on the input or "start" terminal 12 thus actuates the multivibrator 11 to remove the bias from the gated amplifier and shaper 3 so as to impress the square pulses 5 on the "units" counter 7 and thus to initiate the one-tenth (1/10) second time base signal. Main gate multivibrator circuit 11 preferably includes a short time constant, such as one (1) second, following impressing of the initiating signal on input terminal 12 in order to prevent the possibility of the counters 7 and 8 (and also the other counters to be hereinafter described) from counting switching transients. Thus, at the end of the one second time delay period following the impression of the "start" signal on the input terminal 12, main gate multivibrator 11 transfers to its quiescent state, removing the bias from the gated amplified and shaper 3 and thus starting the counters 7 and 8.

As indicated, the 90th pulse from the counter 8 occurs at exactly one-tenth (1/10) of a second following the gating pulse from the main gate multivibrator 11 impressed upon the gated amplifier and shaper 3, this pulse from the output circuit 9 of the "tens" counter 8 being applied to the other input circuit 13 of the main gate multivibrator 11. Receipt of the one-tenth (1/10) second time base pulse by the main gate multivibrator 11 triggers nd biases the gated amplifier and shaper 3 to cut-off thus terminating the square pulses 5 impressed on the "units" counter 7. It will now be seen that the main gate multivibrator 11 initiates and the "units" and "tens" counters 7 and 8 determine the one-tenth (1/10) second time base signal. It will also be readily apparent that a time base signal of different duration may be readily provided by connecting the output circuit 9 of the "tens" counter 8 to a different one of the ten cathodes of that counter.

Another input terminal 15 is provided adapted to be connected to the source of unknown PRF. In the illustrated embodiment, the system is intended to determine whether the unknown PRF is within the range of 400±80 pulses per second. Unknown PRF input terminal 15 is connected to the input circuit of a conventional gated amplifier 16 which in turn has its gating signal input circuit 17 connected to main gate multivibrator 11 for receiving the same gating signals therefrom that are received by the gated amplifier and shaper 3. It is thus seen that gated amplifier 16 will be gated on by the main gate multivibrator simultaneously with gating on of the gated amplifier and shaper 3 and subsequently will be gated off simultaneously with gating off of the gated amplifier and shaper 3 responsive to the one-tenth (1/10) second time interval provided by the counters 7 and 8.

Gated amplifier 16 has its output circuit 18 coupled to a conventional pulse shaper multivibrator 19 and it is thus seen, assuming that the unknown PRF impressed on the input terminal 15 is 400±80 pulses per second, that 40±8 pulses per second will be impressed upon the pulse shaper multivibrator 19 during the one-tenth (1/10) second time base interval. The pulses 21 in the output circuit 18 of gated amplifier 16 impressed upon the pulse shaper multivibrator 19 during the one-tenth second time base interval trigger the pulse shaper multivibrator 19 to increase the pulse width and divide the PRF by two, resulting in 20±4 pulses in output circuit 20; pulse shaper multivibrator 19 is of the type which "flips" in one direction, responsive to receipt of a first pulse, and subsequently "flips" in the opposite direction responsive to receipt of the next successive pulse, thus providing the divided pulses 22 in its output circuit 20.

Output circuit 20 of pulse shaper multivibrator 19 is connected to another "units" counter 23 which in turn has its tenth cathode connected to "tens" counter 24. The "units" counter 23 and "tens" counter 24 again are preferably conventional ten digit counting tubes. It will thus be readily seen that "units" counter 23 will count the divided PRF pulses 22 impressed thereon, providing an output pulse in its output circuit 25 to the "tens" counter 24 responsive to every ten pulses 22 impressed thereon, "tens" counter 24 in turn counting the pulses impressed thereon by the "units" counter 23. In the illustrated embodiment, output circuits 26 and 27 are taken from the fourth and sixth cathodes of the "units" counter 23 with output circuits 28 and 29 being taken from the first and second cathodes of the "tens" counter 24. Thus, it is seen that an output pulse will be provided in the output circuit 26 responsive to the fourth one in every ten pulses 21 impressed on the "units" counter 23 and an output pulse will be provided in the output circuit 27 responsive to the sixth one of every ten pulses impressed on the "units" counter 23. Likewise, output pulses will be provided in output circuits 28 and 29 of "tens" counter 24 responsive to the first and second respectively of every ten pulses counted by the "tens" counter 24.

The output circuits 26, 27 and 28, 29 of the "units" counter 23 and "tens" counter 24 are connected to a diode adding circuit 31 as shown. More particularly, output circuit 26 of "units" counter 23 has diode 32 and resistors 33 and 34 connecting the same to ground as shown. Output circuit 29 of "tens" counter 24 is connected to point 35 between diode 32 and resistor 33 by a serially connected diode 36. Output circuit 27 of "units" counter 23 is connected to point 37 between resistors 33 and 34 by serially connected diode 38 and resistor 39. Finally, output circuit 28 of "tens" counter 24 is connected to point 40 between resistor 39 and diode 38 by diode 41.

It will now be readily seen that the pulses in the output circuit 26 of "units" counter 23 responsive to the fourth of every ten pulses 22 impressed thereon are added to the pulses in output circuit 29 from "tens" counter 24 responsive to the second of every ten pulses counted thereby to provide pulses 43 as shown across resistor 33. Likewise, the pulses in output circuit 27 of "units" counter 23 responsive to the sixth of every ten pulses 22 counted thereby are added to the pulses in the output circuit 28 of "tens" counter 24 responsive to the first of every ten pulses counted thereby to provide pulses 44 across resistor 39. Pulses 43 and 44 in turn are added across resistor 34 and since these pulses occur sequentially in time, a resulting pulse 45 is impressed by coupling capacitor 46 onto trigger amplifier 47. Reference to Fig. 3 and the accompanying discussion to follow will reveal that peak pulses 48 and 49 occur at the sixteenth and twenty-fourth pulses 22 counted by the "units" and "tens" counters 23 and 24. As will be hereinafter more fully understood, the sixteenth trigger or limit pulse 48 provides the lower limit for the coincidence evaluation and the upper trigger limit pulse 49, which occurs on the twenty-fourth pulse, will not be produced when the PRF of the input signal applied to the input terminal 15 is less than 480 since the counters 23 and 24 will stop at one-tenth (1/10) second.

Trigger amplifier 47 is normally biased to cut-off at input signal levels below a predetermined amount so that it passes only the limit pulses 48 and 49 which had their origin in the "units" counter 23 but does not pass signals having the level of the pulses 50 and 51 which had their origin in the "tens" counter 24. The output circuit 53 of the trigger amplifier 47 impresses the trigger or limit pulses 48 and 49 upon a conventional gated multivibrator 54 which provides pulses 55 which are initiated responsive to the limit pulses 48, i.e., the sixteenth of the pulses 22 impressed on the counters 23 and 24, and terminated responsive to the upper limit pulses 49, i.e., the twenty-fourth of the pulses 22 counted by the counters 23 and 24. The output circuit 56 of the gated multivibrator 54 is in turn coupled to one of the input circuits of coincidence circuit 57, which may be one of the grids of a conventional thyratron evaluator tube. The other input circuit 58 of the coincidence circuit 57 is coupled to the output circuit 9 of the "tens" counter 8. Thus, the one-tenth (1/10) second time base pulse 61 from the "tens" counter 8 is impressed on one of the input circuits of the coincidence circuit 57 while the pulse 55 is impressed upon the other input circuit. It will be readily understood that the two pulses must find coincidence in the coincidence circuit 57 in order to fire the thyratron and to produce a "go" signal in the output circuit 59; absence of firing of the thyratron provides a "no-go" signal in the other output circuit 60. Momentary reference to Fig. 2a will reveal that when the 90 second time base pulse 61 arrives at the coincidence circuit 57 during the interval when the limit pulse 55 is impressed thereon, coincidence circuit 57 will provide the "go" indication in its output circuit 59. Reference to Fig. 2b will reveal that when the unknown PRF impressed upon the input circuit 15 is faster than 480 pulses per second, pulse 55 will have terminated in coincidence circuit 57 prior to arrival of the one-tenth (1/10) second time base pulse 61 so that the "no-go" output indication prevails. Likewise, it will be readily seen that when the PRF impressed upon the input terminal 15 is slower than 320 pulses per second, the counters 7, 8, 23, 24 will be gated off by the 90th pulse 61 before arrival of the leading edge of the pulse 55, i.e., the sixteenth pulse impressed on counters 23 and 24 thus again resulting in a "no-go" indication.

Referring now to Fig. 3, operation of the system of Fig. 1 will be described, assuming a PRF of 440 pulses per second impressed upon the input terminal 15 with a 900 cycle per second standard frequency applied on the input terminal 2. Assuming now that counters 7 and 8 are arranged to provide a one-tenth (1/10) second time base, i.e., responsive to the 90th pulse of the 900 cycle per second standard, forty-four (44) pulses 21 of the PRF impressed upon the input terminal 15 will be passed to the pulse shaper multivibrator 19 as shown in Fig. 3a. This in turn will result in the passing of twenty-two pulses 22 from the pulse shaper multivibrator 19 to the counters 23 and 24 as shown in Fig. 3b. The fourth pulse of every ten (10) pulses 22 impressed on "units" counter 23 will appear in output circuit 26 and thus, as shown in Fig. 3c, pulses 4 and 14 will appear in the output circuit 26. At this point, it should be observed that had the unknown PRF in fact had a PRF of 480 cycles per second, rather than 440, forty-eight (48) pulses 21 would have been provided in the output circuit 18 of gated amplifier 16 during the one-tenth (1/10) second time base period, the remaining four pulses being shown in dashed lines in Fig. 3a, and the corresponding remaining two pulses 22 in the output circuit of pulse shaper and multivibrator 19 likewise being shown in dashed lines. With an input PRF of 480, the twenty-fourth pulse 22 impressed upon the "units" counter 23 would appear in output circuit 26, this twenty-fourth pulse being shown by dashed lines in Fig. 3c.

Likewise, the sixth pulse of each ten pulses 22 counted by the "units" counter 23 appears in the output circuit 27 and thus the 6th and 16th pulses are provided in output circuit 27 during the one-tenth (1/10) second time base period, as shown in Fig. 3d.

It will be recalled that an output pulse is provided from the "units" counter 23 to the "tens" counter 24 responsive to each ten pulses counted by the "units" counter, and that output pulses provided in output circuits 28 and 29 responsive to first and second respectively of each pulse counted by the "tens" counter 24. Thus, an output pulse 50 is provided in output circuit 28 of "tens" counter 24 as shown in Fig. 3e, such pulse having a length equal to the duration of ten of the input pulses 22 counted by the "units" counter 23. The second pulse 51 counted by the "tens" counter 24 then appears in the output circuit 29 as shown in Fig. 3f, this pulse being cut short, however, by termination of the counter operation responsive to the one-tenth second time base signal 61.

Referring now to Fig. 3g, it will be seen that the sixteenth pulse, identified as pulse 48, which appears in output circuit 27 is added to the first pulse, identified as pulse 50 appearing in output circuit 28 of "tens" counter 24 in that portion of the adding circuit formed by diodes 38 and 41 and resistors 39 and 34 to form pulse 44. Assuming now again that the input PRF is 400 pulses per second, it will be seen that the 1/10 second time base pulse 61 terminates pulse 51 in the output circuit 29 of "tens" counter 24 prior to adding of the 24th pulse 49 thereto. However, should the input PRF have been 480 pulses per second, it will be seen in the dashed line portion of Fig. 3g that the twenty-fourth pulse 49 provided in the output circuit 26 of "units" counter 23 would be added to the pulse 51 in the output circuit 29 of "tens" counter 24 in the portion of the adder circuit formed by diodes 32 and 36 and the resistors 33 and 34 to form pulse 43. It will further be seen that pulses 43 and 44 are added across resistor 34 of the adder circuit, appearing in time sequence as pulse 45 by virtue of the sequential impressing of pulses 50 and 51 upon output circuits 28 and 29 of the "tens" counter 24.

As previously indicated, the cut-off of trigger amplifier 47, shown here in dashed lines 62 in Fig. 3g, is set so that the amplitude level of pulses 50 and 51 is not sufficient to provide an output signal so that only the sixteenth pulse 48 (and if present the twenty-fourth pulse 49) appear in the output circuit 53 of trigger amplifier 47 as shown in Fig. 3h. The pulse 48 impressed upon the gated multivibrator 54 in turn initiates pulse 55, as shown in Fig. 3I, this pulse being terminated either by expiration of the one-tenth (1/10) second time base period responsive to pulse 61, or by the occurrence of the twenty-fourth pulse 49 in the event that the input PRF is 480 pulses per second or higher.

As shown in Fig. 3J, pulse 55 is impressed upon coincidence circuit 57 by output circuit 56 of gated multivibrator 54, the coincidence circuit 57, which as indicated is preferably a thyratron evaluator tube, having a firing or ionization level higher than the level of pulse 55, as shown in dashed lines 63 in Fig. 3J. Thus, the coincidence circuit 57 will not provide an output indication unless its input level is higher than that shown by the dashed lines 63. Arrival of the time base signal 61 from the "tens" counter 8 at the input circuit 58 of the coincidence circuit 57 provides such increased level, provided that pulse 55 is still present at the coincidence circuit 57 as shown in Fig. 3J.

It will be readily seen that after each one-tenth (1/10) second counting period, main gate multivibrator 11 is gated off in turn gating off the gated amplifier and shaper 3 and the gated amplifier circuit 16 to terminate action of the counters 7, 8, 23 and 24. Thereafter, another starting signal must be impressed upon the input terminal 12 of main gate multivibrator 11 in order to initiate another counting action.

In the preferred embodiment of my invention described above, the system employs a one-tenth (1/10) second counting time because each limit and the standard frequency was a multiple of ten. It will be readily apparent, however, that other limits and standards may be readily employed with variations in the time base or counting time and the number of counters employed. Thus, if the standard frequency employed was 60 cycles per second, commercial power line frequency, rather than the 900 cycles per second described, the "tens" counter 8 could be eliminated and the sixth pulse from the "units" counter 7 employed to provide a one-tenth (1/10) second shut-off and evaluation pulse 61. It will be readily seen that the unknown signal being evaluated can have a sine wave configuration rather than a square-shaped pulse configuration by merely adding a pulse shaper to the gated amplifier 16 so that it is in essence identical to the gated amplifier and shaper 3. It will be readily apparent that my improved system may be used to count items sensed by a photocell, r.p.m., or any other quantity which can be reduced to a train of pulses or an alternating current signal by merely connecting the PRF input 15 to appropriate photocells or other mechanical or electrical sensing devices.

It will be readily seen that with my improved system, the count-down of a standard frequency eliminates the requirement for a mechanical time standard such as a tuning fork or synchronous clock, and that the use of counter tubes instead of the phantastrons previously employed simplifies the bias and reset circuits and permits ready switching to different counter cathodes to obtain different time bases and limit pulses.

While I have described above the principles of my invention in connection with specific apparatus, it is to be clearly understood that this description is made only by way of example and not as a limitation to the scope of my invention.

What is claimed is:

1. A system for determining whether an unknown number of pulses occurring in a predetermined time is within predetermined lower and upper pulse repetition frequency limits comprising: first counting means adapted to be connected to a source of standard frequency for counting the same and for providing a time base signal responsive to a predetermined number of cycles of standard frequency thereby establishing said predetermined time; second counting means adapted to be connected to the source of said unknown pulses for counting the same; said first counting means being coupled to said second counting means for terminating said unknown pulses responsive to said time base signal; said second counting means being arranged to provide a first lower limit signal responsive to a first lower predetermined number of unknown pulses counted thereby and a second upper limit signal responsive to a second upper predetermined number of unknown pulses counted thereby; and coincidence means coupled to said first and second counting means for providing an output signal responsive to occurrence of said time base signal between said lower and upper limit signals.

2. A system for determining whether an unknown number of pulses occurring in a predetermined times is within predetermined lower and upper pulse repetition frequency limits comprising: first counting means adapted to be connected to a source of standard frequency for counting the same and for providing a time base signal responsive to a predetermined number of cycles of said standard frequency thereby establishing said predetermined time; gate means adapted to be connected to the source of said unknown pulses; said first counting means being coupled to said gate means for actuating the same to terminate said unknown pulses responsive to said time base signal; second counting means coupled to said gate means for counting said unknown pulses, said second counting means being aranged to provide a first lower limit signal responsive to a first lower predetermined number of unknown pulses counted thereby and a second upper limit signal responsive to a second upper predetermined number of unknown pulses counted thereby; and coincidence means coupled to said first and second counting means for providing an output signal responsive to occurrence of said time base signal between said lower and upper limit signals.

3. A system for determining whether an unknown number of pulses occurring in a predetermined time is within predetermined lower and upper pulse repetition frequency limits comprising: first counting means having an input circuit adapted to be connected to a source of standard frequency for counting the same, said first counting means having an output circuit for providing a time base signal responsive to a predetermined number of cycles of said standard frequency thereby establishing said predetermined time; gating means having a signal input circuit adapted to be connected to the source of said unknown pulses and having a gate signal input circuit coupled to said first counting means output circuit for gating off said unknown pulses responsive to said time base signal, said gating means having an ouput circuit for passing said unknown pulses during said predetermined time; second counting means having an input circuit coupled to said gating means output circuit for counting said unknown pulses during said predetermined time, said second counting means having first and second output circuits for respectively providing lower and upper limit signals responsive respectively to a first lower and a second higher predetermined number of said unknown pulses counted thereby; and coincidence means having a first signal input circuit coupled to said first counting means output circuit and a second signal input circuit coupled to said second counting means output circuits, said coincidence means having an output circuit for providing a signal responsive to occurrence of said time base signal between said upper and lower limit signals.

4. A system for determining whether an unknown number of pulses occurring in a predetermined time is within predetermined lower and upper pulse repetition frequency limits comprising: first counting means adapted to be connected to a source of standard frequency for counting the same and for providing a time base signal responsive to a predetermined number of cycles of said standard frequency thereby establishing said predetermined time; gate means adapted to be connected to the source of said unknown pulses; said first counting means being coupled to said gate means for actuating the same to terminate said unknown pulses responsive to said time base signal; second counting means coupled to said gate means for counting said unknown pulses, said second counting means being arranged to provide lower and upper limit signals respectively responsive to a first lower and a second higher predetermined number of said unknown pulses counted thereby; adding means coupled to said second counting means for adding said limit signals to provide another signal initiated responsive to said lower limit signal and terminated responsive to said upper limit signal; and coincidence means coupled to said first counting means and to said adding means for providing an output signal responsive to coincidence of said time base and other signals.

5. A system for determining whether an unknown number of pulses occurring in a predetermined time is within predetermined lower and upper pulse repetition frequency limits comprising: first gating means adapted to be connected to a source of standard frequency; second gating means adapted to be connected to the source of said unknown pulses; third gating means coupled to said first and second gating means and arranged to gate the same in response to application of an initiating signal; first counting means coupled to said first gating means for counting said standard frequency, said first counting means being arranged to provide a time base signal responsive to a predetermined number of cycles of said standard frequency thereby establishing said predetermined time, said first counting means being coupled to said third gating means whereby said standard frequency and unknown pulses are gated off responsive to said time base signal; second counting means coupled to said second gating means for counting said unknown pulses, said second counting means being arranged to provide a first lower limit signal responsive to a first lower predetermined number of unknown pulses counted thereby and a second upper limit signal responsive to a second upper predetermined number of unknown pulses counted thereby; and coincidence means coupled to said first and second counting means for providing an output signal responsive to occurrence of said time base signal between said lower and upper limit signals.

6. A system for determining whether an unknown number of pulses occurring in a predetermined time is within predetermined lower and upper pulse repetition frequency limits comprising: a first input circuit adapted to be connected to a source of standard frequency; first counting means including a first ten digit counter coupled to said first input circuit for counting said standard frequency and arranged to provide an output time base pulse responsive to a predetermined number of cycles of said standard frequency thereby establishing said predetermined time; a second input circuit adapted to be connected to the source of said unknown pulses; second counting means including a second ten digit counter coupled to said second input circuit for counting said unknown pulses and arranged to provide lower and upper limit pulses responsive respectively to first lower and second upper predetermined numbers of pulses counted thereby; and coincidence means coupled to receive said time base pulse and said limit pulses and arranged to provide an output indication responsive to said time base pulse falling between said limit pulses.

7. A system for determining whether an unknown number of pulses occurring in a predetermined time is within predetermined lower and upper pulse repetition frequency limits comprising: a first input circuit adapted to be connected to a source of standard frequency; a first ten digit counter coupled to said first input circuit for counting said standard frequency and arranged to provide an output pulse responsive to every ten cycles of said standard frequency; a second ten digit counter coupled to said first counter for counting said output pulses and arranged to provide an output time base pulse responsive to a predetermined number of said first counter output pulses thereby establishing said predetermined time; a second input circuit adapted to be connected to the source of said unknown pulses; a third ten digit counter coupled to said second input circuit for counting said unknown pulses and arranged to provide a first output pulse responsive to every ten of said unknown pulses, said third counter being further arranged to provide second and third output pulses responsive respectively to predetermined ones of said unknown pulses counted thereby; a fourth ten digit counter coupled to said third ten digit counter and arranged to count said first output pulses therefrom, said fourth counter being further arranged to provide fourth and fifth output pulses respectively to predetermined ones of said first output pulses counted thereby; said second counter being coupled to said second input circuit for terminating said unknown pulses responsive to said time base pulse; adding means coupled to said third and fourth counters for adding said second, third, fourth and fifth output pulses to provide upper and lower limit pulses; and coincidence means coupled to said second counter and to said adding means and arranged to provide an output signal responsive to said time base pulse falling between said upper and lower limit pulses.

8. A system for determining whether an unknown number of pulses occurring in a predetermined time is within predetermined lower and upper pulse repetition frequency limits comprising: a first input circuit adapted to be connected to a source of standard frequency; a first ten digit counter coupled to said first input circuit for counting said standard frequency and arranged to provide an output pulse responsive to every ten cycles of said standard frequency; a second ten digit counter coupled to said first counter for counting said output pulses and arranged to provide an output time base pulse responsive to a predetermined number of said first counter output pulses thereby establishing said predetermined time; a second input circuit adapted to be connected to the source of said unknown pulses; a third ten digit counter coupled to said second input circuit for counting said unknown pulses and having a first output circuit for providing a first output pulse responsive to every ten of said unknown pulses said third counter having second and third output circuits arranged to provide second and third output pulses responsive respectively to predetermined ones of said unknown pulses counted thereby; a fourth ten digit counter coupled to said first output circuit of said third counter for counting said first output pulses therefrom, said fourth counter having first and second output circuits arranged to provide first and second output pulses responsive respectively to predetermined ones of said first output pulses from said third counter counted thereby; said second counter being coupled to said second input circuit for terminating said unknown pulses responsive to said time base pulse; first adding means coupled to said fourth counter first output circuit and one of said third counter second and third output circuits for adding the output pulses respectively therein to provide a lower limit pulse; second adding means coupled to said fourth counter second output circuit and the other of said third counter second and third output circuits for adding the output pulses respectively therein to provide a higher limit pulse; and coincidence means coupled to said second counter and to said adding means and arranged to provide an output signal responsive to said time base pulse falling between said upper and lower limit pulses.

9. The combination of claim 8 in which said first and second adding means each include a pair of diodes, and in which said first and second adding means are further coupled to add said lower and upper limit pulses.

10. A system for determining whether an unknown number of pulses occurring in a predetremined time is within predetermined lower and upper pulse repetition frequency limits comprising: a first input circuit adapted to be connected to a source of standard frequency; a first ten digit counter coupled to said first input circuit for counting said standard frequency and arranged to provide an output pulse responsive to every ten cycles of said standard frequency; a second ten digit counter coupled to said first counter for counting said output pulses and arranged to provide an output time base pulse responsive to a predetermined number of said first counter output pulses thereby establishing said predetermined time; a second input circuit adapted to be connected to the source of said unknown pulses; a third ten digit counter coupled to said second input circuit for counting said unknown pulses and having a first output circuit for providing a first output pulse responsive to every ten of said unknown pulses said third counter having second and third output circuits arranged to provide second and third output pulses responsive respectively to predetermined ones of said unknown pulses counted thereby; a fourth ten digit counter coupled to said first output circuit of said third counter for counting said first output pulses therefrom, said fourth counter having first and second output circuits arranged to provide first and second output pulses responsive respectively to predetermined ones of said first output pulses from said third counter counted thereby; said second counter being coupled to said second input circuit for terminating said unknown pulses responsive to said time base pulse; first adding means coupled to said fourth counter first output circuit and one of said third counter second and third output circuits for adding the output pulses respectively therein to provide a lower limit pulse; second adding means coupled to said fourth counter second output circuit and the other of said third counter second and third output circuits for adding the output pulses respectively therein to provide a higher limit pulse; means for adding said lower and upper limit pulses; pulse forming means for providing another pulse initiated responsive to said lower limit pulse and terminated responsive to said upper limit pulse; and a coincidence circuit coupled to said second counter and said pulse forming means for respectively receiving said time base pulse and said other pulse therefrom and for providing an output signal responsive to coincidence thereof.

11. A system for determining whether an unknown number of pulses occurring in a predetermined time is within predetermined lower and upper pulse repetition frequency limits comprising: a first input circuit adapted to be connected to a source of standard frequency; a first gating circuit coupled to said first input circuit; a second input circuit adapted to be connected to the source of said unknown pulses; a second gating circuit coupled to said second input circuit; a third gating circuit coupled to said first and second gating circuits and adapted to be connected to a source of initiating signals whereby said first and second gating circuits simultaneously gate on said standard frequency and said unknown pulses responsive to said initiating signal; a first ten digit counter coupled to said first gating circuit for counting said standard frequency passed thereby and arranged to provide an output pulse responsive to every ten cycles of said standard frequency; a second ten digit counter coupled to said first counter for counting said output pulses therefrom and having an output circuit arranged to provide an output time base pulse responsive to a predetermined number of said first counter output pulses thereby establishing said predetermined time, said second counter output circuit being coupled to said third gating circuit whereby said time base pulse actuates the same so that said first and second gating circuits simultaneously gate off said standard frequency and unknown pulses; multivibrator means coupled to said second gating circuit for dividing the PRF of said unknown pulses passed thereby during said predetermined time; a third ten digit counter coupled to said multivibrator means for counting the pulses passed thereby and having a first output circuit for providing a first output pulse responsive to every ten of said divided pulses; said third counter having second and third output circuits arranged to provide second and third output pulses responsive respectively to predetermined ones of said divided pulses counted thereby; a fourth ten digit counter coupled to said first output circuit of said third counter for counting said first output pulses therefrom; said fourth counter having first and second output circuits arranged to provide first and second output pulses responsive respectively to predetermined ones of said first output pulses from said third counter counted thereby; an adding circuit coupled to said second and third output circuits of said third counter and said first and second output circuits of said fourth counter for providing lower and upper limit pulses responsive respectively to first and second predetermined ones of said divided pulses; pulse forming means coupled to said adding circuit for providing a single pulse initiated by said lower limit pulse and terminated by said upper limit pulse; and a coincidence circuit coupled to said second counter output circuit and to said pulse forming means and arranged to provide an output signal responsive to coincidence of said time base pulse and said other pulse.

References Cited in the file of this patent

UNITED STATES PATENTS

| | | |
|---|---|---|
| 2,414,479 | Miller | Jan. 21, 1947 |
| 2,516,189 | Dinsmore | July 25, 1950 |
| 2,738,461 | Burbeck | Mar. 13, 1956 |

FOREIGN PATENTS

| | | |
|---|---|---|
| 770,035 | Great Britain | Mar. 13, 1957 |
| 1,146,664 | France | May 27, 1957 |
| 799,674 | Great Britain | Aug. 13, 1958 |